UNITED STATES PATENT OFFICE.

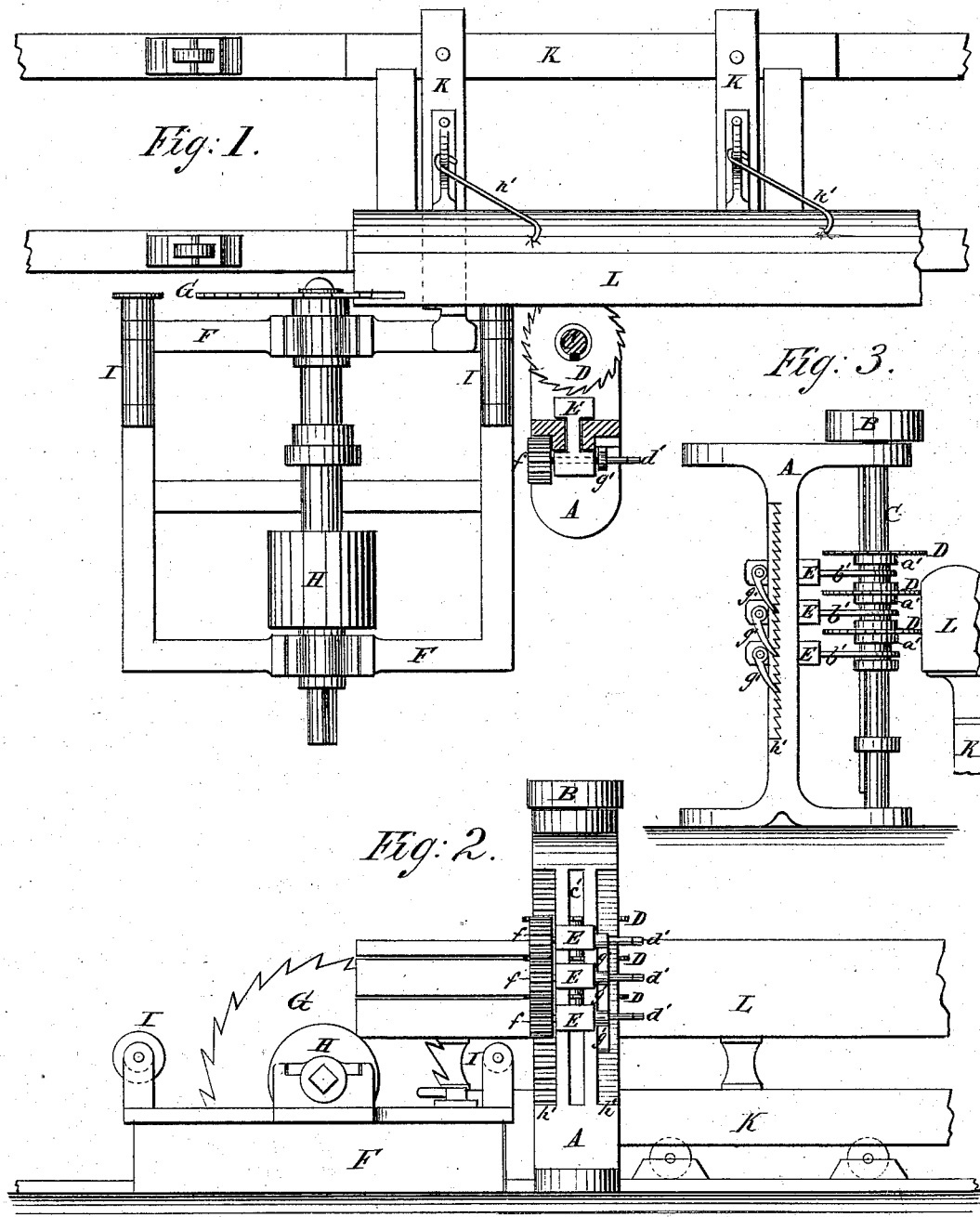

JOHN W. MORRIS, OF MOSS POINT, MISSISSIPPI.

IMPROVEMENT IN GANG CIRCULAR SAW MILLS.

Specification forming part of Letters Patent No. 219,497, dated September 9, 1879; application filed April 16, 1879.

*To all whom it may concern:*

Be it known that I, JOHN W. MORRIS, of Moss Point, in the county of Jackson and State of Mississippi, have invented a new and Improved Gang Circular Saw Mill, of which the following is a specification.

Figure 1 is a plan of the mill, partly in section. Fig. 2 is a front elevation of the same. Fig. 3 is a side elevation of the standard, vertical arbor, saws, and connecting head-blocks.

Similar letters of reference indicate corresponding parts.

The object of this invention is to provide a device for sawing logs into boards or joists, &c., of any desired thickness and width at one and the same time at one operation.

The invention consists of the standard A, secured and made to revolve in which, by application of power to the pulleys B, is the vertical saw-arbor C, carrying one or more circular saws, D D, keyed thereon, and adjustable vertically by means of the collars $a'$ $a'$, that are set on the arbor above, below, and between the saws, and are connected to the head-blocks E E by the stout rods $b'$ $b'$. These head-blocks are supported and are vertically adjustable within the slot $c'$ in the standard A on rods $d'$ $d'$, that pass laterally through their fronts, and that have each on the one end a cog-wheel, $f'$, and on the other a pawl, $g'$, which engage in the racks $h'$ $h'$ on the front edges of the standard.

F is a timber frame, that supports the arbor of the circular saw G, that revolves in a vertical plane through power applied to the pulley H.

I I are two conducting-rollers, designed for the easier removal of the sawed lumber.

To the carrier K, that may be of the usual design, the log L, that is to be sawed, is secured by the dogs $k'$ $k'$. The log may be adjusted so that the saw G shall cut any desired thickness of board, and it will be seen that the saws D D may be adjusted at the same time to saw the boards of any desired width, all the saws running at the same time, and G at a right angle to D D.

It will be seen that by the application of a wrench to the pawl ends of the rods $d'$ $d'$ the head-blocks carrying the saws D D may be moved up and down on the racks $h'$ $h'$, and the saws thereby be set to cut to any width, and whenever desired they can be entirely raised above the log, so as to be out of the way of other work.

Lumber can be made much truer by this device than by any other with which I am acquainted, for as the cut is made in the side of the log before the board is cut off, there can be no spring in its width.

When using the ordinary dog the log has to be turned but once, and when an improved dog is used the log need not be turned at all during the sawing.

This device enables me to nearly double the capacity of a mill without increased consumption of power or of labor in feeding or adjusting the logs.

Having thus described my invention, I claim as new and desire to secure by Letters Patent—

1. The standard A, pulley B, vertical arbor C, circular saws D D, collars $a'$ $a'$, rods $b'$ $b'$, head-blocks E E, rods $d'$ $d'$, cog-wheels $f'$ $f'$, pawls $g'$ $g'$, and racks $h'$ $h'$, constructed and arranged substantially as and for the purpose described.

2. The standard A, pulley B, vertical arbor C, circular saws D D, collars $a'$ $a'$, rods $b'$ $b'$ and $d'$ $d'$, head-blocks E E, cog-wheels $f'$ $f'$, pawls $g'$ $g'$, and racks $h'$ $h'$, in combination with the circular saw G, substantially as and for the purpose described.

JOHN WESLEY MORRIS.

Witnesses:
A. P. DENNY,
A. S. DENNY.